United States Patent [19]

Sisk

[11] Patent Number: 5,030,037
[45] Date of Patent: Jul. 9, 1991

[54] POROUS FILTER PAD FOR FLUID PRESSURE CONVEYING SYSTEMS

[76] Inventor: David E. Sisk, R.R. #1, Box 340, Bonne Terre, Mo. 63628

[21] Appl. No.: 286,240

[22] Filed: Dec. 19, 1988

[51] Int. Cl.$^5$ .............................................. B65G 53/38
[52] U.S. Cl. ......................................... 406/91; 406/90; 406/138
[58] Field of Search .................... 406/90, 91, 136, 137, 406/138; 366/101, 106

[56] References Cited

U.S. PATENT DOCUMENTS

| | | | |
|---|---|---|---|
| 3,236,422 | 2/1966 | Bailey et al. | 406/91 |
| 3,302,979 | 2/1967 | Rollins et al. | 406/91 |
| 3,862,707 | 1/1975 | Reiter | 406/138 |
| 4,262,034 | 4/1981 | Anderson | 406/138 |
| 4,371,295 | 2/1983 | Hart | 406/138 |
| 4,439,072 | 3/1984 | Goodken | 406/91 |

Primary Examiner—Joseph F. Peters, Jr.
Assistant Examiner—Christopher P. Ellis
Attorney, Agent, or Firm—Paul M. Denk

[57] ABSTRACT

A porous filter pad for use in conjunction with a fluid pressure conveying system is disclosed. The porous filter pad includes a rigid, self-supporting molded plastic body having a predetermined elongated shape with opposed walls. Openings of a predetermined porosity are provided along one wall and openings of a predetermined smaller porosity are provided along the other wall. Inner tortuous pathways within the molded plastic body interconnect the openings between the opposed walls. The molded plastic body includes a plurality of molded and bonded particles which are formed in close proximity to one another at least along the wall having the openings of predetermined smaller porosity and are compressed into a more compact and dense relationship as a coherent mass with the openings of predetermined smaller porosity therein.

24 Claims, 3 Drawing Sheets

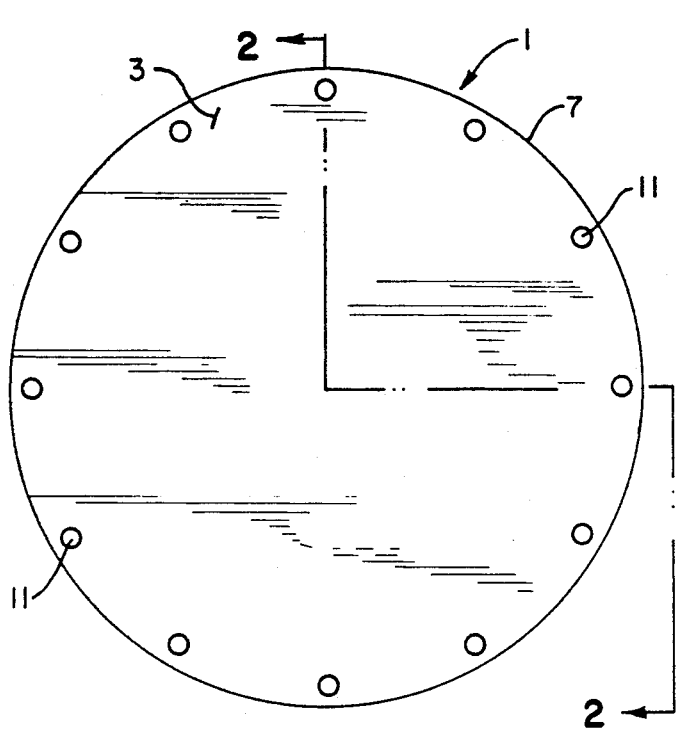
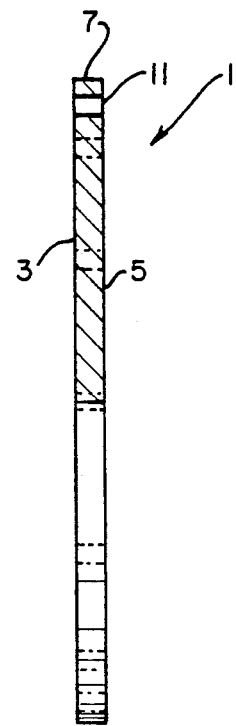
FIG.1.  FIG.2.
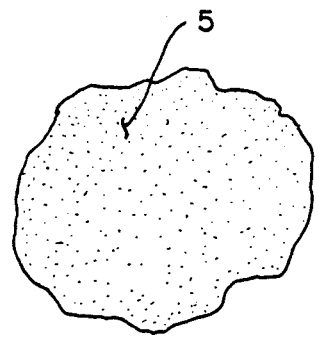
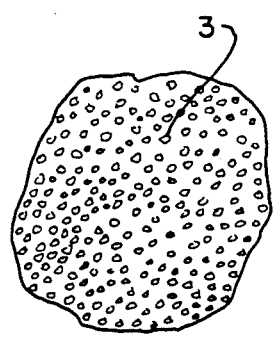
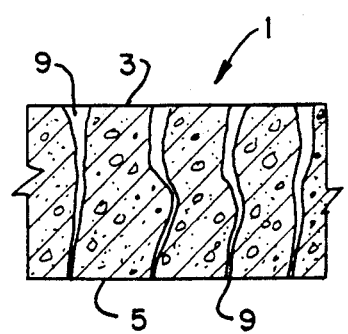
FIG.3.  FIG.4.  FIG.5.

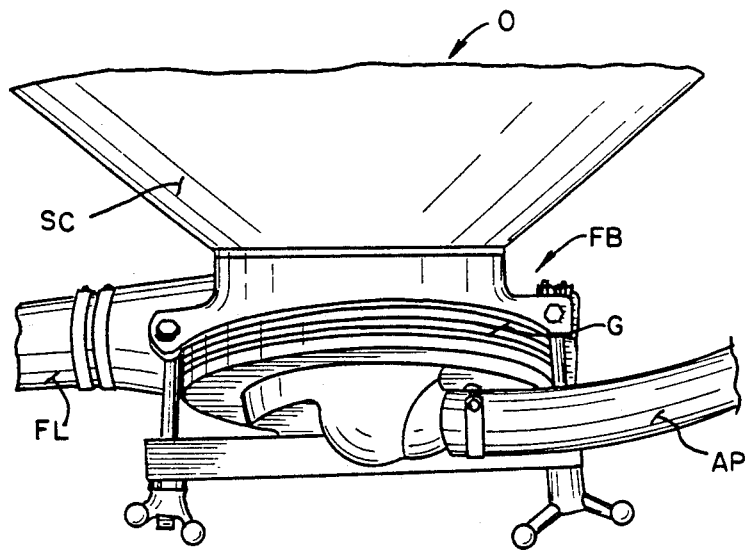
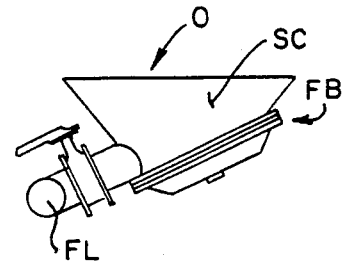
FIG. 11.
FIG. 12.
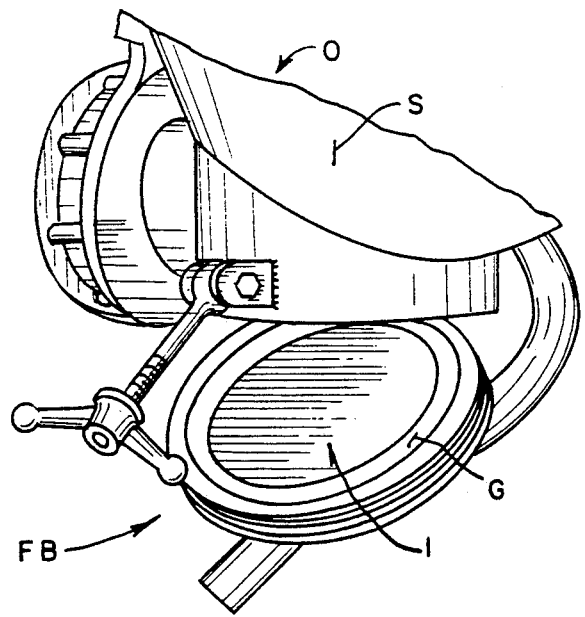
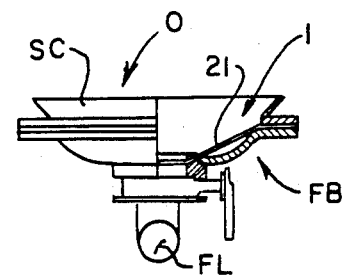
FIG. 13.
FIG. 14.

POROUS FILTER PAD FOR FLUID PRESSURE CONVEYING SYSTEMS

BACKGROUND OF THE INVENTION

The present invention relates to a porous filter pad or membrane for use in conjunction with a fluid pressure conveying system, such as a fluidized bed to assist in unloading bulk granular material particles into a flow line or trough.

Fluid pressure conveying systems for transferring or conveying bulk granular material particles from a storage chamber to a flow line or trough are well known. Storage chambers may be provided in various equipment including a hopper truck, hopper car, storage silo, bin, and in other in-plant uses and the like. Such storage chambers typically have fluidized beds where pressurized air is directed through an aeration pad or membrane to assist in conveying or transferring the bulk granular material particles from the storage chamber to a flow line or trough for unloading purposes. It is well known that the construction of such fluidized beds including the air permeable or aeration pad is very important in determining the speed and efficiency of the material unloaded.

The present invention is directed principally to the construction of a new and improved porous filter or aeration pad for use in conjunction with various types of fluid pressure conveying systems, some of which are described below in the typical environment in which such porous filter or aeration pad may be used.

The prior art is replete with various and different types of filter or aeration pads which have been constructed of various and different types of materials, made in one or several pieces and/or formed in a woven material construction. Examples of some different types of pads are shown, for example, in U.S. Pat. Nos. 4,355,928 and 4,568,244; although these patents are by no means an exhaustive disclosure of the prior art background showing the many and different types of filter or aeration pads that have been developed and/or have been used.

It will be apparent, however, that prior art filter or aeration pads or membranes have sought to provide constructions which not only serve to enhance high speed and efficiency, but which are also relatively economical, do not require extensive installation and maintenance cost, and do not require frequent replacement.

Typically, most filter or aeration pads currently in use are of some type of woven fabric construction to allow air to readily pass through the pad for the desired fluidization, while providing all of the foregoing features.

Some times the granular material particles can become impregnated in the woven fabric constructions, causing contamination and/or requiring cleaning. Water is typically used to clean the woven filter pads, and as can be expected, such pads require long drying time before they can be re-used, resulting in delay or interruption in changing over the fluid conveying system to a different product. Conventional woven fabric pads also usually have substantial back air pressure, that is, return of air back into the woven filter pad, resulting in lower overall efficiency and effectiveness in unloading granular material particles.

While porous filter pads, including those of woven construction, have worked quite well in the various environments in which they have been used, it will be understood, from the description of the present invention which is described in detail below, that there are numerous other areas of improvement possible which not only eliminate the disadvantages of prior art constructions, but which also provide new and improved features, operating conditions and better performance over prior art constructions, as will become apparent.

SUMMARY OF THE INVENTION

Among the several objects and advantages of the present invention include:

the provision of a new and improved porous filter pad that overcomes the aforenoted and other deficiencies of the prior art;

the provision of the aforementioned porous filter pad which is more effective in use than conventional fabric pads and other constructions, reducing unloading time by up to 25%-35%, for more profitable operation by a user;

the provision of such aforementioned porous filter pad which is formed as a one-piece porous molded plastic body to substantially reduce unloading time for bulk granular material particle;

the provision of the aforementioned porous filter pad which allows more air flow through the porous molded plastic body, with substantially less back pressure, resulting in a decrease in time required to unload the bulk granular material particles;

the provision of the aforementioned porous filter pad which eliminates product impregnation and contamination, thus reducing or eliminating down time and product changeovers;

the provision of the aforementioned porous filter pad which is completely washable, without being subjected to water penetration, to provide fast and efficient product changeovers, as may be desired;

the provision of the aforementioned porous filter pad which is extremely wear and tear resistant, can withstand substantially higher temperatures, and is FDA approved and;

the provision of the aforementioned porous filter pad which is simple and economical to manufacture using widely available materials and conventional forming techniques; does not require substantial installation or maintenance; is extremely durable in operation and use; does not require frequent replacement; and is otherwise well adapted for the purposes intended.

Briefly stated, the porous filter pad of the present invention is constructed for use in conjunction with a fluid pressure conveying system which has a fluidization bed or the like. The porous filter pad comprises a rigid, self-supporting molded plastic body having a predetermined elongated shape with opposed walls. Openings of a predetermined porosity are provided along one wall and openings of a predetermined smaller porosity are provided along other wall. Inner tortuous pathways within the molded plastic body interconnect the openings in the opposed walls.

The molded plastic body comprises a plurality of molded and bonded particles which are formed in close proximity to one another at least along the one wall having the openings of predetermined smaller porosity. The plurality of molded and bonded particles in closer proximity to one another at least along the one wall are compressed into a more compact and dense relationship as a coherent mass with the openings of predetermined smaller porosity therein.

The porous filter pad is provided with a circumferentially spaced series of through passageways around the outer marginal periphery thereof for receiving fasteners to secure the pad in a fluid pressure conveying system. The through passageways may also extend through gasket means, extending around the outer periphery of the pad at least on one wall thereof.

The gasket means extending around the outer periphery of the pad will sealingly mount the porous filter pad in a fluid pressure conveying system. The gasket means may be separate from the pad for use in conjunction therewith on one or both of the walls around the outer periphery thereof. The gasket means may also be integrally formed on one or both of the walls around the outer periphery of the pad.

In one embodiment of the invention, a reinforced and interlocking grid structure may extend throughout the molded plastic body for reinforcing the molded plastic body. The molded plastic body may be formed from porous polycarbonate, polyethene, porous polyamide or any other suitable material in order to function as described herein. As known, polycarbonate is a polyester of carbonic acid.

Other and further objects and advantages of the present invention will be apparent from the description that follows.

BRIEF DESCRIPTION OF THE DRAWINGS

FIG. 1 is a top plan view of a porous filter pad for use in conjunction with a fluid pressure conveying system, the porous filter pad being constructed in accordance with the teachings of the present invention;

FIG. 2 is a side elevational view, partly in section, of the porous filter pad as shown along lines 2—2 of FIG. 1;

FIG. 3 is an enlarged fragmentary bottom plan view of the porous filter pad with openings of predetermined smaller capacity and size;

FIG. 4 is an enlarged fragmentary top plan view of the porous filter pad illustrating openings of greater size and capacity along an opposite wall of the porous filter pad;

FIG. 5 is an enlarged sectional view illustrating the larger and smaller openings of predetermined porosity on opposite sides of the porous filter pad with interconnecting tortuous pathways running between the openings in the opposed walls of the pad;

Corresponding reference numerals will be used throughout the several figures in the drawings.

DESCRIPTION OF THE PREFERRED EMBODIMENT

Figure 6:
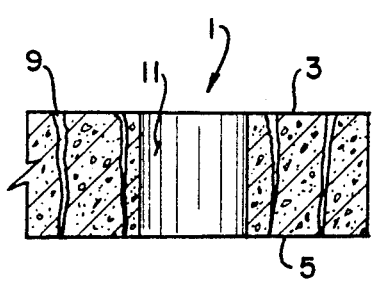
FIG. 6 is an enlarged fragmentary sectional view of the porous filter pad showing a through passageway therethrough for receiving a fastener in order to secure the pad in a fluid pressure conveying system.

The following detailed description illustrates the principles of the invention by way of example, and not by way of limitation. This description will clearly enable one skilled in the art to make and use the invention, and describe several embodiments, adaptions, variations, alternatives and uses of the invention, including what I presently believe is the best mode of carrying out the invention.

The various porous filter pad embodiments illustrated in FIGS. 1-10 of the drawings may be used in conjunction with the various fluid pressure conveying systems illustrated in FIGS. 11-14 of the drawings. It will be understood, however, that the porous filter pad of the present invention may be used with other and different types of fluid pressure conveying systems than those illustrated or described herein, since the invention is principally directed to the porous filter pad and its operation and use in conjunction with fluid pressure conveying systems of any design and construction.

Reference is now made to the various forms and embodiments of the porous filter pad 1 illustrated in FIGS. 1-10 of the drawings. As shown in FIGS. 1-2, the porous filter pad 1 is a rigid, self-supporting molded plastic body having a predetermined elongated shape, as may be desired. The pad 1 illustrated in the drawings is a disk-shaped element which is generally the shape of most filter or aeration pads used in fluid pressure conveying systems, although it will be apparent that other shapes and designs may be employed for the particular application needed., The porous filter pad 1 includes generally opposed and parallel outer walls 3, 5, together with a marginal edge or circumferential wall portion 7 extending around the outer periphery of the pad 1.

The porous filter pad 1 is formed as a one-piece molded plastic body from a porous polycarbonate, polyethylene or porous polyamide, i.e., "Nylon". The porous filter pad 1 may be injection molded or otherwise formed as a plurality of molded and bonded particles which are formed in closer proximity to one another at least along the outer wall 5 so as to provide openings along the outer wall 5 of predetermined smaller porosity than the openings along the other opposed wall 3, as best seen in FIG. 3-5 of the drawings. Specifically, the molded and bonded particles are in closer proximity to one another along at least the outer wall 5 because the plastic body of the porous filter pad 1 is compressed into a more compact and dense relationship as a coherent mass, thereby providing the openings of predetermined smaller porosity in the outer wall 5.

As seen in FIG. 5 of the drawings, there are inner tortuous pathways 9 within the molded plastic body of the porous filter pad 1 that extend between the openings in the opposed walls 3, 5. It will be seen that the interconnecting tortuous pathways 9 are shown as being reduced or constricted in size as they extend away from the larger porosity openings along the outer wall 3 and throughout the molded plastic body of the porous filter pad 1. At or in the vicinity of the opposed wall 5, where the openings between the molded and bonded particles of the molded plastic body have a predetermined smaller porosity the tortuous pathways 9 have been reduced or constricted to the maximum extent. For example, if the openings along the outer wall 3 have about a 120 micron porosity the openings at or in the vicinity of the outer wall 5 have a much smaller micron porosity, even down to a 5 micron porosity along the outer wall 5.

As a result, pressurized air may be passed through the molded plastic body of the porous filter pad 1, first through the larger porosity openings along the outer wall 3, through the tortuous pathways 9, and then out through the smaller predetermined porosity openings in the outer wall 5, allowing air to readily pass through the porous filter pad 1, but at the same time, filtering any granular material particles that are transported or conveyed past the porous filter pad 1 in a liquid pressure conveying system.

In FIGS. 11-14 of the drawings, various types and kinds of liquid pressure conveying systems are shown where product is unloaded from a storage chamber into a flow line or trough. For example, FIGS. 11 and 13 show a hopper truck or tank trailer discharge outlet O having a storage chamber SC from which bulk granular material particles, i.e., starch, flour, Kaolin clay, soda ash, hydrate lime, plastic pellets, etc., are unloaded into a flow line or trough FL. A fluidized bed FB is positioned below the storage chamber SC and communicates with the flow line FL. Air under pressure is ejected by the air pressure line AP into the fluidized bed FB, to keep the bulk granular material particles unloaded from the storage chamber SC, from blocking or otherwise compacting together, causing unloading problems. In the fluidized bed FB, the porous filter pad 1 is shown in FIG. 13 of the drawings as being sealed to the fluidized bed FB by the gaskets G associated with the fluidized bed FB, with the outer wall 3 in the larger porosity openings positioned to receive pressure from air pressure line AP to first pass therethrough and then out the smaller porosity openings along the outer wall 5. In FIG. 12 of the drawings, a modified form of discharge outlet 0 is shown; however, the overall operation of porous filter pad 1 as disclosed by the present invention is generally the same. In FIG. 14 of the drawings, the modified form of discharge outlet 0 has a different construction; however, it will be understood that storage chamber SC discharges the granular material products from the storage chamber into the flow line FL with assistance of the fluidized bed FB. In FIG. 14 of the drawings, it will be noted that the porous filter pad 1 is not constructed in a disk-shape, but has a depressed or well section 21 to conform to this particular discharge outlet configuration. This illustrates that the porous filter pad 1 may have shapes other than the flat disk-shape as illustrated in FIGS. 1-10 of the drawings.

In order to attach and secure the porous filter pad 1 in a fluid pressure conveying system, such as those illustrated in FIGS. 11-14 of the drawings, a circumferentially spaced series of through passageways 11 may be provided around the outer marginal periphery of the porous filter pad 1 for receiving threaded fasteners or the like in order to secure the pad 1 in the fluid pressure conveying system.

Figure 7:
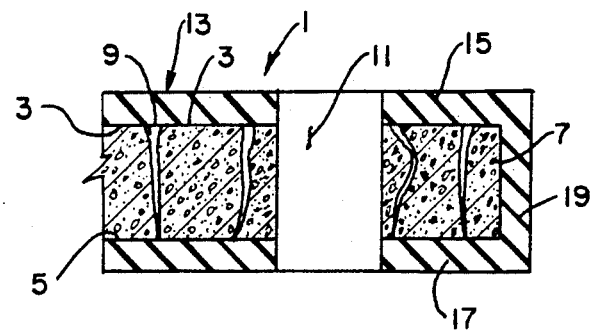
FIG. 7 is an enlarged fragmentary sectional view of a porous filter pad with separate gasket means mounted about the pad and also showing a through passageway into which a fastener may be mounted for securing the pad with associated gasket means in a fluid pressure conveying system.
Figure 8:
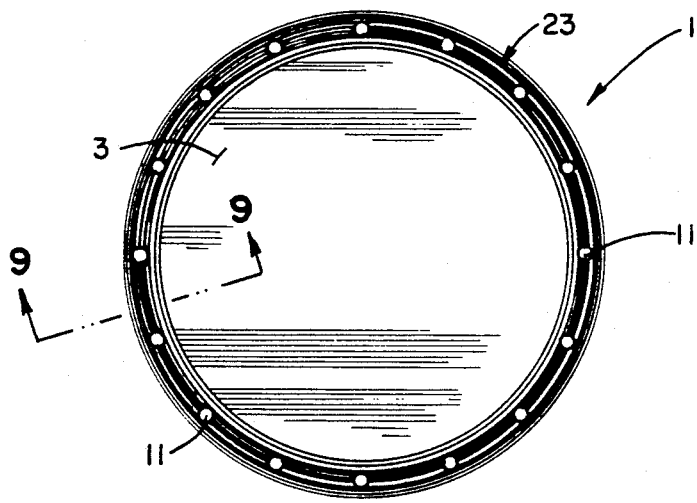
FIG. 8 is a top plan view of a modified form of porous filter pad within the purview of the present invention.
Figure 9:
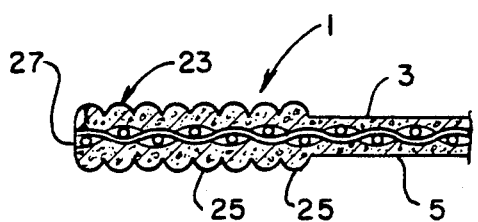
FIG. 9 is an enlarged fragmentary perspective view illustrating the construction of the porous filter pad shown in FIG. 8 as viewed along 9—9 thereof.
Figure 10:
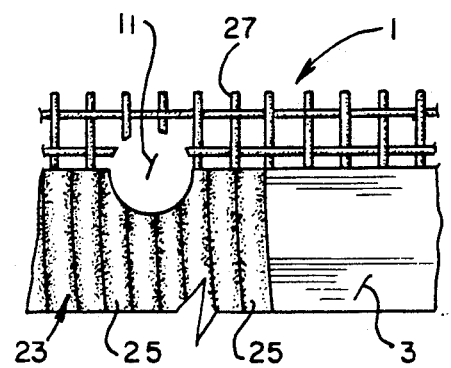
FIG. 10 is an enlarged fragmentary top plan view illustrating the construction of the porous filter pad with included reinforced and interlocking grid structure for reinforcing same.

The porous filter pad 1 may also be provided with a separate gasket element 13 such as shown in FIG. 7 or an integral gasket element 23 illustrated in FIGS. 8-10 of the drawings, as may be desired. The gaskets are provided around the outer perimeter of the pad 1. FIG. 6 of the drawings illustrates the porous filter pad 1 in its basic construction, without any gasket means whatsoever, for comparing the same with various embodiments and alternative constructions where gasket elements may be used, as shown in FIGS. 7-10 of the drawings.

In FIG. 7 of the drawings, the gasket element 13 may comprise an annular-shaped cover or boot having opposed gasket sections 15, 17 overlying the outer walls 3, 5, respectively, and interconnecting end wall 19 which overlies the outer marginal surface 7 of the porous filter pad. This gasket may be of rubber, plastic, metal or the like. It will also be noted that the through passageway 11 is shown in the FIG. 7 of the embodiment as extending not only through the porous filter pad 1, but also through the gasket element 13. It will apparent that other and different types of separate gasket element may be associated with the porous filter pad 1, either on one or both of the walls 3, 5, to provide the desired sealing engagement of the porous filter pad 1 relative to the fluid pressure conveying system in which it is to be used.

In FIGS. 8-10 of the drawings, a modified form of porous filter pad 21 is shown a having an integral gasket section 23 which extends circumferentially or peripherally around the porous filter pad 21. In FIG. 9 of the drawings, the integrally formed gasket 23 includes a series of separate circumferentially or peripherally extending ribs or gasket sealing surfaces 25 on both the outer walls 3, 5 of the porous filter pad 1. The shape and peripheral extent of the integral gasket 23 may being changed to suit the particulars desired.

In the FIGS. 8-10 embodiment, a reinforced and interlocking grid structure 27 is generally centrally located relative to the molded plastic body so as to reinforce the porous filter pad 1 throughout. The reinforced and interlocking grid structure may comprise a wire or nylon cloth which is insert molded within the molded plastic body of the porous filter pad 1 during the molding thereof.

In each of the several embodiments shown in FIGS. 1-10 of the drawings, including variations and modifications thereof, it will be apparent that the porous filter pad 1 with the larger openings along the outer wall 3, will allow air to pass readily through the molded plastic body of the porous filter pad 1, while allowing the smaller porosity openings at or in the vicinity of the outer wall 5 to prevent back pressure flow of either air or any product or dust back into the porous filter pad. The outer surface, along the outer wall 5, has sufficiently small porosity openings therein such that there will be little, if any, product impregnation and contamination in the porous filter pad, as compared to conventional fabric pad which has substantial problems in this area. In addition, the porous filter pad 1 of the present invention is completely washable, but since there will be little if any water penetration, fast an easy product changeovers may be accomplished, unlike the experiences using that of conventional fabric pads which require long drying time. It has been discovered that there is up to 30% less back pressure with the porous filter pad 1 of the present invention as compared to conventional fabric pads. The porous filter pad of the present invention can also reduce unloading time by up to 25%-35% for more profitable operations and less down time to users. It will also be apparent that the porous filter pad 1 of the present invention also is substantially wear and tear resistant, while accommodating relatively high temperature conditions, and at the same time being FDA approved for granular food particle use.

For most fluid pressure conveying applications, the porous filter pad preferably has a thickness on the order of ⅜ inch; however, the porous filter pad may be molded in thicker or thinner constructions for various applications, as may be desired.

In view of the above, it will be seen that the several objects and features of this invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

I claim:

1. A porous filter pad for use in conjunction with a fluid pressure conveying system, said porous filter pad comprising a rigid, self-supporting molded plastic body of integral construction having a predetermined elongated shape with opposing walls, openings of a predetermine porosity along one wall, openings of a predetermined smaller porosity along said other wall, and inner tortuous pathways within said molded plastic body between the openings in said opposed walls of the integral pad, said molded plastic body comprising a plurality of molded and bonded particles which are formed in closer proximity to one another at least along said other wall having the openings of predetermined smaller porosity, with the plurality of molded and bonded particles in closer proximity to one another along said other wall being compressed into a more compact and dense relationship as a coherent mass with said openings of predetermined smaller porosity therein, whereby filtering of dust particles can be achieved by passing pressurized air entrained with such particles initially through the openings of predetermined porosity along one wall of the pad, through the inner tortuous pathways, and out of the openings of predetermined smaller porosity along said other wall thereof.

2. In a fluid pressure conveying system for conveying bulk granular material particles from a storage chamber for discharge into a fluid conveying line and having a fluidized bed between said storage chamber and fluid conveying line to facilitate transfer of said bulk granular material particles, the improvement comprising a porous filter pad for use in conjunction with said fluidized bed, said filter pad comprising a rigid, self-supported molded plastic body having a predetermined elongated shape with opposed walls, openings of a predetermined porosity along one wall, openings of a predetermined smaller porosity along said other wall, and inner tortuous pathways within said molded plastic body between the openings in said opposed walls, said molded plastic body comprising a plurality of molded and bonded particles which are formed in closer proximity to one another at least along said other wall having the openings of predetermined smaller porosity therein, the plurality of molded and bonded particles in closer proximity to one another at least along said other wall are compressed into a more compact and dense relationship as a coherent mass with said openings of predetermined smaller porosity therein, whereby the conveyance of bulk granular material through the movement of pressurized air providing for removal of dust particles entrained in said air by passing said porosity along one wall, further passing said pressurized air through said tortuous pathways, and capturing said dust at the surface of the wall wherein the openings of a predetermined smaller porosity locate, in order to filter dust from the pressurized air as the fluid pressure conveying system conveys bulk granular material to discharge.

3. A porous filter pad for use in conjunction with a fluid pressure conveying system, said porous filter pad comprising a rigid, self-supporting molded plastic body having a predetermined elongated shape with opposed walls, openings of a predetermined porosity along one wall, openings of a predetermined smaller porosity along said other wall, and inner tortuous pathways within said molded plastic body between the openings in said opposed walls, said molded plastic body comprises a plurality of molded and bonded particles which are formed in closer proximity to one another at least along said one wall having the openings of predetermined smaller porosity, the plurality of molded and bonded particles in closer proximity to one another at least along said one wall are compressed into a more compact and dense relationship as a coherent mass with said openings of predetermined smaller porosity therein, said pad including gasket means extending around the periphery thereof for sealingly mounting said porous filter pad in a fluid pressure conveying system, said gasket means is separate from said pad and is used in conjunction therewith on at least one of said walls around the outer periphery thereof, and said gasket means being secured to said pad around the outer periphery thereof.

4. A porous filter pad for use in conjunction with a fluid pressure conveying system, said porous filter pad comprising a rigid, self-supporting molded plastic body having a predetermined elongated shape with opposed walls, openings of a predetermine porosity along one wall, openings of a predetermined smaller porosity along said other wall, and inner tortuous pathways within said molded plastic body between the openings in said opposed walls, said molded plastic body comprises a plurality of molded and bonded particles which are formed in closer proximity to one another at least along said one wall having the openings of predetermined smaller porosity, the plurality of molded and bonded particles in closer proximity to one another at least along said one wall being compressed into a more compact and dense relationship as a coherent mass with said openings of predetermined smaller porosity therein, said pad including a gasket means extending around the periphery thereof for sealingly mounting said porous filter pad in a fluid pressure conveying system, said gasket means being secured to said pad around the outer periphery thereof, said gasket means is integrally formed in said pad on at least one of said walls around the outer periphery thereof.

5. A porous filter pad for use in conjunction with a fluid pressure conveying system, said porous filter pad comprising a rigid, self-supporting molded plastic body of integral construction having a predetermined elongated shape with opposing walls, openings of a predetermine porosity along one wall, openings of a predetermine smaller porosity along said other wall, and inner tortuous pathways within said molded plastic body between the openings in said opposed walls of the integral pad, said molded plastic body comprising a plurality of molded and bond particles which are formed in closer proximity to one another at least along said other wall having the openings of predetermined smaller porosity, with a plurality of molded and bonded particles in closer proximity to one another along said other wall being compressed into a more compact and dense relationship as a coherent mass with said openings of predetermined smaller porosity therein, said pad including gasket means extending around the outer periphery thereof for sealingly mounting said porous filter pad in a fluid pressure conveying system, said gasket means being separate from said pad and is used in conjunction therewith on at least one of said walls around the outer periphery thereof, said gasket means being secured to said pad around the outer periphery thereof, whereby filtering of dust particles can be achieved by passing pressurized air entrained with such particles initially through the openings of predetermined porosity along one wall of the pad, through inner tortuous pathways, and out of the openings of predetermine smaller porosity along said other wall thereof.

6. A porous filter pad for use in conjunction with a fluid pressure conveying system, said porous filter pad comprising a rigid, self-supporting molded plastic body of integral construction having a predetermined elongated shape with opposing walls, openings of a predetermined porosity along one wall, openings of a predetermined smaller porosity along said other wall, and inner tortuous pathways within said molded plastic body between the openings in said opposed walls of the integral pad, said molded plastic body comprising a plurality of molded and bonded particles which are formed in closer proximity to one another at least along said other wall having the openings of predetermined smaller porosity, with a plurality of molded and bonded particles in closer proximity to one another along said other wall being compressed into a more compact and dense relationship as a coherent mass with said openings of predetermined smaller porosity therein, said pad including gasket means extending around the outer periphery thereof for sealingly mounting said porous filter pad in a fluid pressure conveying system, said gasket means being integrally formed in said pad on at least one of said walls around the outer periphery thereof, whereby filtering of dust particles can be achieved by passing pressurized air entrained with such particles initially through the openings of predetermined porosity along one wall of the pad, through the inner tortuous pathways, and out of the openings of predetermined smaller porosity along said other wall thereof.

7. The porous filter pad as defined in claim 1 wherein said pad is provided with a circumferentially spaced series of through passageways around the outer marginal periphery thereof for receiving fasteners to secure said pad in a fluid pressure conveying system.

8. The porous filter pad as defined in claim 7 wherein said through passageways also extend through gasket means extending around the outer periphery of said pad at least on one wall thereof.

9. The porous filter a pad as defined in claim 1 wherein said pad includes gasket means extending around the outer periphery thereof for sealingly mounting said porous filter pad in a fluid pressure conveying system.

10. The porous filter pad as defined in claim 9 wherein said gasket means is separate from said pad and is used in conjunction therewith on at least one of said walls around the outer periphery thereof.

11. The porous filter pad as defined in claim 6 wherein said gasket means is integrally formed on both of said walls around the outer periphery of said pad and includes a series of separate peripherally extending gasket sealing surfaces.

12. The porous filter pad as defined in claim 11 wherein said gasket sealing surfaces extend laterally beyond the opposed walls of said pad.

13. The porous filter pad as defined in claim 1 wherein said pad includes reinforcing means incorporated within and extending throughout said molded plastic body.

14. The porous filter pad as defined in claim 13 wherein said reinforcing means includes a reinforced and interlocking grid structure generally centrally located relative to said molded plastic body.

15. The porous filter pad as defined in claim 14 wherein said pad including a reinforced and interlocking grid structure extending throughout said molded plastic body.

16. The porous filter pad as defined in claim 15 wherein said pad is provided with a circumferentially spaced series of through passageways around the outer marginal periphery thereof for receiving fasteners to secure said pad in a fluid pressure conveying system.

17. The porous filter pad as defined in claim 1 wherein said molded plastic body is formed from porous polyethene.

18. The porous filter pad as defined in claim 1 wherein said molded plastic body is formed from porous polyamide.

19. The porous filter pad as defined in claim 1 wherein said molded plastic body is formed from polycarbonate.

20. The improvement as defined in claim 2 wherein said molded plastic body comprises a plurality of molded and bonded particles which are formed in closer proximity to one another at least along said one wall having openings of predetermined smaller porosity.

21. The improvement as defined in claim 20 wherein the plurality of molded and bonded particles in closer proximity to one another at least along said one wall are compressed into a more compact and dense relationship as a coherent mass with said openings of predetermined smaller porosity therein.

22. The improvement as defined in claim 21 wherein said pad is provided with a circumferentially spaced series of through passageways around the outer marginal periphery thereof for receiving fasteners to secure said pad in said fluidized bed.

23. The improvement as defined in claim 22 wherein through passageways also extend through gasket means extending around the outer periphery of said pad at least on one wall thereof.

24. The porous filter pad as defined in claim 4 wherein said gasket means is integrally formed on both of said walls around the outer periphery of said pad and includes a series of separate peripherally extending gasket sealing surfaces.

* * * * *

UNITED STATES PATENT AND TRADEMARK OFFICE
CERTIFICATE OF CORRECTION

PATENT NO. : 5,030,037

DATED : July 9, 1991

INVENTOR(S) : David E. Sisk

It is certified that error appears in the above-identified patent and that said Letters Patent is hereby corrected as shown below:

Col. 7, Claim 2, line 44, after "pad" insert ---being of integral construction, said porous filter pad---.

Col. 7, Claim 2, line 62, after "passing said", insert

---air and entrained dust through the opening of predetermined---.

Col. 9, Claim 9, line 53, delete "a".

Col. 10, Claim 15, line 17, change "14" to ---12---.

Signed and Sealed this

Twentieth Day of October, 1992

Attest:

DOUGLAS B. COMER

*Attesting Officer*         Acting Commissioner of Patents and Trademarks